UNITED STATES PATENT OFFICE.

REINHOLD GRÜTER, OF CHARLOTTENBURG, GERMANY, ASSIGNOR TO FARBENFABRIKEN VORM. FRIEDR. BAYER & CO., OF ELBERFELD, GERMANY, A CORPORATION OF GERMANY.

PROCESS FOR RENDERING STERILIZED WATER TASTELESS AND ODORLESS.

1,078,918.   Specification of Letters Patent.   Patented Nov. 18, 1913.

No Drawing.   Application filed February 10, 1913.   Serial No. 747,520.

*To all whom it may concern:*

Be it known that I, REINHOLD GRÜTER, doctor of philosophy, chemist, citizen of the German Empire, residing at Charlottenburg, Germany, have invented new and useful Improvements in Processes for Rendering Sterilized Water Tasteless and Odorless, of which the following is a specification.

It is known that drinkable water can be sterilized and freed from various kinds of bacteria by means of halogen or of salts of hypohalogenous acids. It has however been found that the quantity of disinfecting agents formerly used for this purpose is much too small to destroy for instance typhus bacilli and it is therefore necessary to use for the sterilization the agents before mentioned in considerably larger quantities. To render the water which has been sterilized in this way, odorless and capable of being used the halogen or the salts of hypohalogenous acids were removed from the water by suitable means or rendered innocuous and tasteless. The process used hitherto for this purpose suffers from certain disadvantages which already have been pointed out by Ballner and Engels (*Archiv für Hygiene,* vol. 48, pages 140–178).

It has now been found that water sterilized with halogen or with salts of hypohalogenous acid can be rendered suitable for use and all these disadvantages avoided, if the sterilized water is subjected to an after-treatment with hydrogen peroxid or its derivatives such as peroxids or persalts. Even if considerable quantities of hypochlorite of lime (bleaching powder) have been used for the sterilization the odor of the hypochlorite of lime disappears completely within a short time after the addition of the before mentioned peroxid compounds; the taste likewise does not recall in any way the disinfecting agent which had been used; furthermore the water so treated has no alkaline or salty taste, which would render the drinking of the water objectionable; on the contrary the taste of the water is pleasant and refreshing. The latter is even the case if polluted water had been treated which originally had a bad taste or odor. Although it has been known that salts of hypohalogenous acid react on hydrogen peroxid with evolution of oxygen, the above mentioned effect, that sterilized water could be rendered drinkable in such a perfect way, could not have been foreseen.

In order to illustrate the new process more fully the following example is given, the parts being by weight:—0.25 to 0.3 parts of sodium perborate are well mixed with 1000 parts of water sterilized by treatment with an aqueous paste of 0.3 parts of bleaching powder containing 30 per cent. of active Cl while the water is being stirred. Instead of sodium perborate equivalent quantities of hydrogen peroxid, calcium peroxid, sodium peroxid or other peroxids or persalts may be used. After a few minutes the calcium salts which separate can be filtered off.

It is remarkable that when using perborates which are the most convenient form of per compounds, the boric acid is almost completely precipitated which is of great advantage.

I claim:

1. Process of rendering water, sterilized by treatment with a halogen, tasteless and odorless, which process consists in treating water sterilized in this manner with a peroxid compound which liberates oxygen in the presence of water, substantially as described.

2. Process of rendering water, sterilized by treatment with a salt of a hypohalogenous acid, tasteless and odorless, which process consists in treating water sterilized in this manner with a peroxid compound which liberates oxygen in the presence of water, substantially as described.

3. Process of rendering water, sterilized by treatment with a halogen, tasteless and odorless, which process consists in treating water sterilized in this manner with hydrogen peroxid, substantially as described.

4. Process of rendering water, sterilized by treatment with a salt of hypohalogenous acid, tasteless and odorless, which process consists in treating water sterilized in this manner with hydrogen peroxid, substantially as described.

5. Process of rendering water, sterilized by treatment with a halogen, tasteless and odorless, which process consists in treating water sterilized in this manner with a peroxid which liberates oxygen in the presence of water, substantially as described.

6. Process of rendering water, sterilized by treatment with a salt of hypohalogenous acid, tasteless and odorless, which process consists in treating water sterilized in this manner with a peroxid which liberates oxygen in the presence of water, substantially as described.

7. Process of rendering water, sterilized by treatment with a halogen, tasteless and odorless, which process consists in treating water sterilized in this manner with a percompound which liberates oxygen in the presence of water, substantially as described.

8. Process of rendering water, sterilized by treatment with a salt of hypohalogenous acid, tasteless and odorless, which process consists in treating water sterilized in this manner with a percompound which liberates oxygen in the presence of water, substantially as described.

9. Process of rendering water, sterilized by treatment with chlorin, tasteless and odorless, which process consists in treating water sterilized in this manner with a peroxid compound which liberates oxygen in the presence of water, substantially as described.

10. Process of rendering water, sterilized by treatment with hypochlorite of lime, tasteless and odorless, which process consists in treating water sterilized in this manner with a peroxid compound which liberates oxygen in the presence of water, substantially as described.

In testimony whereof I have hereunto set my hand in the presence of two subscribing witnesses.

REINHOLD GRÜTER.

Witnesses:
HENRY HASPER,
WOLDEMAR HAUPT.